United States Patent
Lee et al.

(10) Patent No.: US 7,940,363 B2
(45) Date of Patent: May 10, 2011

(54) LIQUID CRYSTAL DISPLAY PANEL AND METHOD FOR MANUFACTURING THE SAME

(75) Inventors: Seung-Kyu Lee, Gyeonggi-do (KR); Yong-Suk Yeo, Jecheon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 635 days.

(21) Appl. No.: 11/836,338

(22) Filed: Aug. 9, 2007

(65) Prior Publication Data

US 2008/0068551 A1    Mar. 20, 2008

(30) Foreign Application Priority Data

Sep. 18, 2006  (KR) ................. 10-2006-0090158

(51) Int. Cl.
*G02F 1/1343*    (2006.01)
(52) U.S. Cl. .......................... 349/144; 349/42
(58) Field of Classification Search .................. 349/114, 349/144, 42–43, 141, 441
See application file for complete search history.

(56) References Cited

U.S. PATENT DOCUMENTS

| | | | | |
|---|---|---|---|---|
| 5,594,569 A * | 1/1997 | Konuma et al. | ............... | 349/122 |
| 6,556,265 B1 * | 4/2003 | Murade | ............... | 349/111 |
| 6,661,488 B1 * | 12/2003 | Takeda et al. | ............... | 349/117 |
| 6,940,571 B2 * | 9/2005 | Ham et al. | ............... | 349/106 |
| 7,106,391 B2 * | 9/2006 | Song | ............... | 349/44 |
| 7,167,225 B2 * | 1/2007 | Kim | ............... | 349/139 |
| 7,403,253 B2 * | 7/2008 | Kang | ............... | 349/141 |
| 7,463,319 B2 * | 12/2008 | Roh | ............... | 349/114 |
| 7,525,626 B2 * | 4/2009 | Nagano | ............... | 349/141 |
| 7,538,842 B2 * | 5/2009 | Kim | ............... | 349/129 |
| 7,538,843 B2 * | 5/2009 | Kim | ............... | 349/139 |
| 7,605,891 B2 * | 10/2009 | Chang | ............... | 349/114 |
| 7,633,473 B2 * | 12/2009 | Uh et al. | ............... | 345/87 |
| 2001/0040546 A1 * | 11/2001 | Ohmuro et al. | ............... | 345/87 |
| 2002/0071080 A1 * | 6/2002 | Taniguchi et al. | ............... | 349/139 |
| 2002/0140892 A1 * | 10/2002 | Baek et al. | ............... | 349/141 |
| 2002/0149728 A1 * | 10/2002 | Ogishima et al. | ............... | 349/129 |
| 2004/0125251 A1 * | 7/2004 | Kim | ............... | 349/43 |
| 2004/0212764 A1 * | 10/2004 | Tanaka et al. | ............... | 349/114 |
| 2005/0083466 A1 * | 4/2005 | Lee et al. | ............... | 349/141 |
| 2005/0094078 A1 * | 5/2005 | Kang | ............... | 349/141 |
| 2005/0134540 A1 * | 6/2005 | Kim | ............... | 345/92 |
| 2005/0168672 A1 * | 8/2005 | Tashiro et al. | ............... | 349/114 |
| 2005/0264730 A1 * | 12/2005 | Kataoka et al. | ............... | 349/114 |
| 2006/0033853 A1 * | 2/2006 | Lee et al. | ............... | 349/42 |
| 2006/0125984 A1 * | 6/2006 | Park et al. | ............... | 349/114 |
| 2006/0158588 A1 * | 7/2006 | Uh et al. | ............... | 349/114 |

(Continued)

*Primary Examiner* — Brian M. Healy
*Assistant Examiner* — Peter Radkowski
(74) *Attorney, Agent, or Firm* — F. Chau & Associates, LLC

(57) ABSTRACT

A liquid crystal display (LCD) panel includes first and second substrates, and a liquid crystal layer interposed between the first and second substrates. The first substrate includes gate lines, data lines, a storage line and a pixel electrode. The gate lines extend along a first direction. The data lines extend along a second direction crossing the first direction, and the gate and data lines define a unit pixel. The storage line includes a first line portion extending along the second direction in the unit pixel. The pixel electrode divides the unit pixel into first and second domains. A second substrate faces the first substrate and includes a common electrode having a first hole formed on the common electrode, and the first hole is overlapped with the storage line. The first hole and the storage line are overlapped with each other, so that an opening ratio may be enhanced.

17 Claims, 12 Drawing Sheets

U.S. PATENT DOCUMENTS

| | | | |
|---|---|---|---|
| 2007/0008459 A1* | 1/2007 | Park et al. | 349/96 |
| 2007/0019134 A1* | 1/2007 | Park et al. | 349/96 |
| 2007/0052891 A1* | 3/2007 | Kim et al. | 349/117 |
| 2007/0171336 A1* | 7/2007 | Kim et al. | 349/102 |
| 2008/0143940 A1* | 6/2008 | Yoshida et al. | 349/114 |

* cited by examiner

LIQUID CRYSTAL DISPLAY PANEL AND METHOD FOR MANUFACTURING THE SAME

CROSS-REFERENCE TO RELATED APPLICATIONS

This application claims priority to Korean Patent Application No. 2006-90158, filed on Sep. 18, 2006 in the Korean Intellectual Property Office (KIPO), the disclosure of which is incorporated by reference herein.

BACKGROUND OF THE INVENTION

1. Technical Field

The present disclosure relates to a liquid crystal display (LCD) panel and a method for manufacturing the LCD panel. More particularly, the present disclosure relates to an LCD panel for improving an opening ratio and a method for manufacturing the LCD panel.

2. Discussion of the Related Art

A conventional liquid crystal display (LCD) panel includes an array substrate having a thin-film transistor (TFT) that is a switching device for driving each pixel, a counter substrate having a common electrode layer formed thereon, and a liquid crystal layer disposed between the array substrate and the counter substrate. The LCD panel applies an electric field to the liquid crystal layer to display images by controlling transmissivity of light.

In an LCD panel having a vertical alignment (VA) mode, when voltage is not applied to the array and counter substrates, liquid crystal molecules in the liquid crystal layer are arranged substantially perpendicular to the substrates so that black is displayed. An LCD panel having a patterned vertical alignment (PVA) mode that defines multiple domains in each pixel may be used to enhance a viewing angle of the VA mode LCD panel.

A mobile PVA (mPVA) mode, which is a type of PVA mode that defines multiple domains, divides each unit pixel into two or three domains, and forms a pixel electrode that includes sub-electrodes corresponding to each domain. In addition, a hole is formed at the common electrode layer corresponding to a central portion of each domain, so that the sub-electrode and electric flux lines are formed. The hole does not transmit light and is conventionally formed to have a diameter of about 10 μm to maintain an opening ratio for each pixel.

The liquid crystal molecules have a high response speed in areas in which the electric flux lines are formed, for example, an edge area of the sub-electrode and an area adjacent to the hole. However, the liquid crystal molecules have a slow response speed in a middle area between the edge area of the sub-electrode and the area adjacent to the hole.

When the hole is formed to have a relatively smaller diameter to reduce a width of the middle area, the opening ratio of each pixel is reduced.

Thus, there is a need for a liquid crystal display (LCD) panel with an improved opening ratio.

SUMMARY OF THE INVENTION

According to an exemplary embodiment of the present invention an LCD panel includes a first substrate, a second substrate and a liquid crystal layer disposed between the first and second substrates. The first substrate has a plurality of gate lines, a plurality of data lines, a storage line and a pixel electrode. The gate lines extend along a first direction, and the data lines extend along a second direction crossing the first direction. The gate and data lines define a unit pixel. The storage line includes a first line portion that extends along the second direction in the unit pixel, and the pixel electrode divides the unit pixel into a first domain and a second domain. The second substrate faces the first substrate and includes a common electrode on which a first hole is formed. The first hole is overlapped with the storage line to correspond to the first and second domains, respectively.

According to an exemplary embodiment of the present invention, an LCD panel includes a first substrate, a second substrate and a liquid crystal layer disposed between the first and second substrates. The first substrate has a plurality of gate lines, a plurality of data lines, a storage line and a pixel electrode. The gate lines extend along a first direction, the data lines extend along a second direction crossing the first direction. The gate and data lines define a unit pixel. The storage line includes a first line portion that extends along the second direction in the unit pixel, and the pixel electrode divides the unit pixel into a first domain, a second domain and a third domain.

According to an exemplary embodiment of the present invention, a method for manufacturing an LCD panel is provided. The method includes forming a storage line and a plurality of gate lines parallel on a first substrate and a first line portion extending substantially perpendicular to the gate lines, forming a plurality of data lines on the first substrate on which the gate lines are formed to cross the gate lines for defining a plurality of unit pixels, forming a passivation layer on the first substrate on which the data lines are formed, forming a pixel electrode by dividing a unit pixel of the plurality of unit pixels into at least two domains on the passivation layer, forming a common electrode layer on the second substrate, combining the first substrate with the second substrate, and disposing a liquid crystal layer between the first and second substrates. The first line portion is disposed between the gate and data lines. The first hole is formed in the common electrode layer, and is overlapped with the storage line.

BRIEF DESCRIPTION OF THE DRAWINGS

The above and other features of the present invention will become more readily apparent by describing in detail exemplary embodiments thereof with reference to the accompanying drawings, in which.

DETAILED DESCRIPTION OF EXEMPLARY EMBODIMENTS

The invention is described more fully hereinafter with reference to the accompanying drawings, in which embodiments of the invention are shown. This invention may, however, be embodied in many different forms and should not be construed as limited to the embodiments set forth herein. It will be understood that when an element or layer is referred to as being "on," "connected to" or "coupled to" another element or layer, it can be directly on, connected or coupled to the other element or layer or intervening elements or layers may be present. Hereinafter, exemplary embodiments of the present invention will be explained in more detail with reference to the accompanying drawings.

Figure 1:
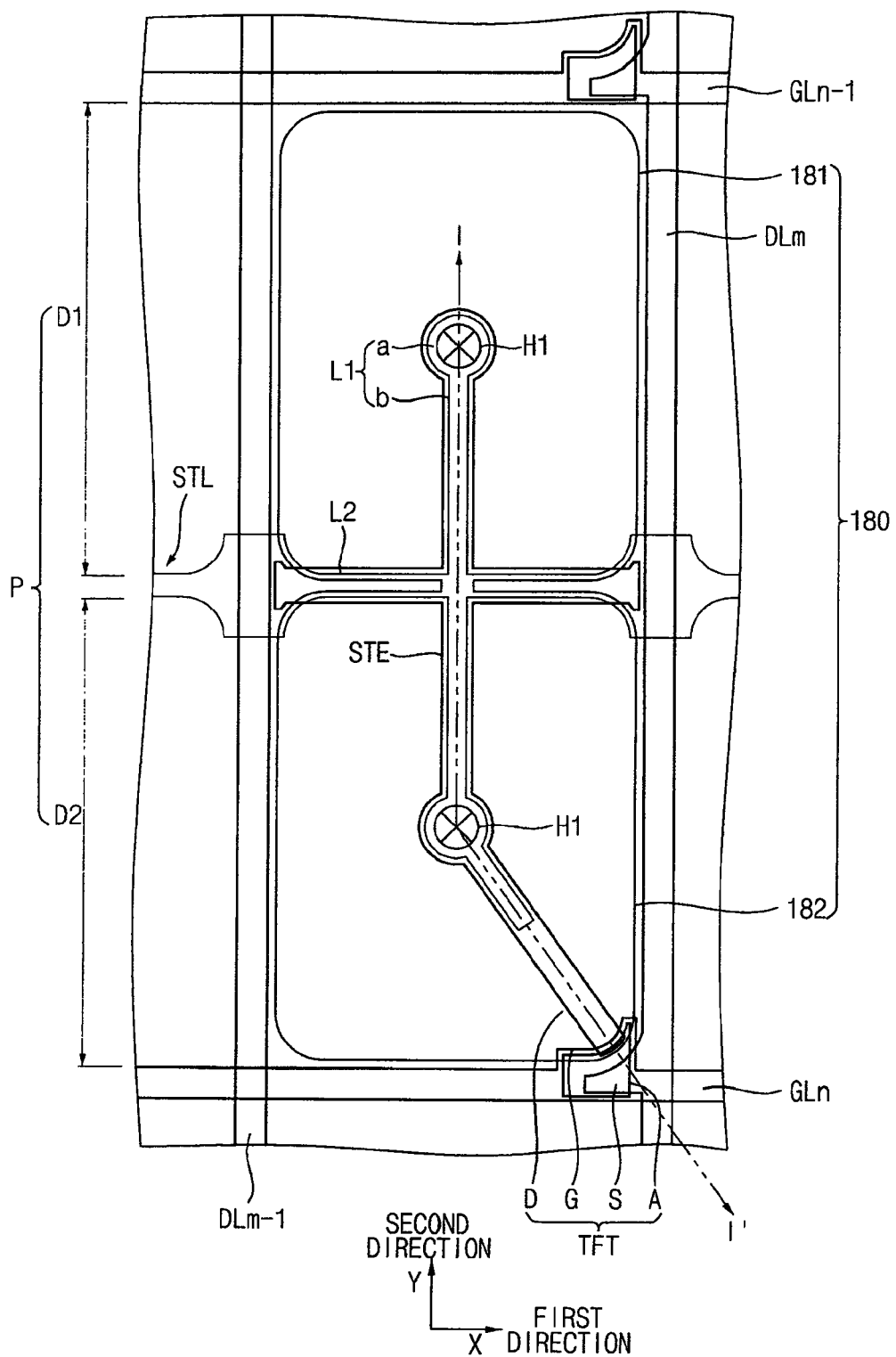
FIG. 1 is a plan view illustrating a first substrate of a liquid crystal display (LCD) panel according to an exemplary embodiment of the present invention.
Figure 2:
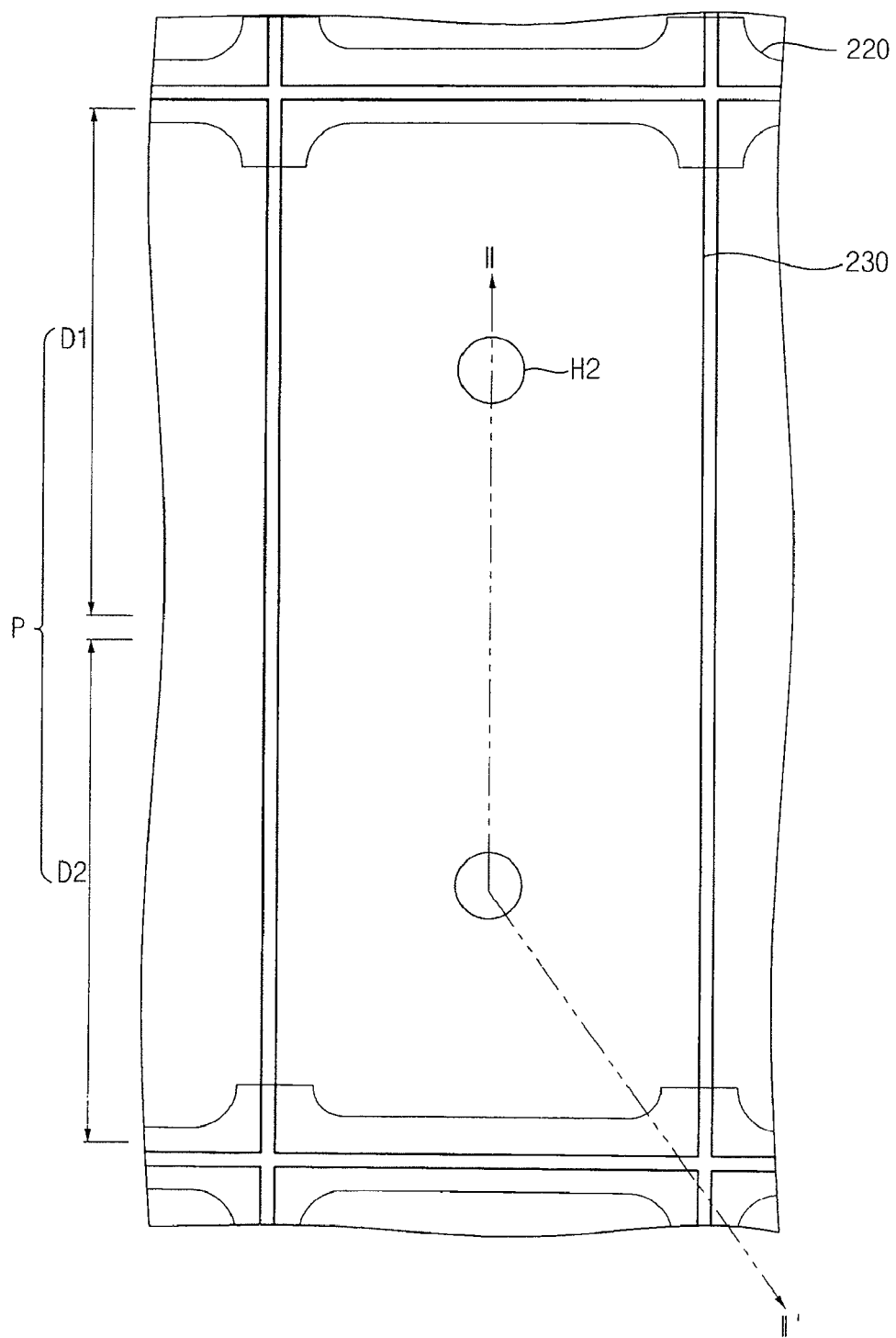
FIG. 2 is a plan view illustrating a second substrate of the LCD panel according to the exemplary embodiment of the present invention.
Figure 3:
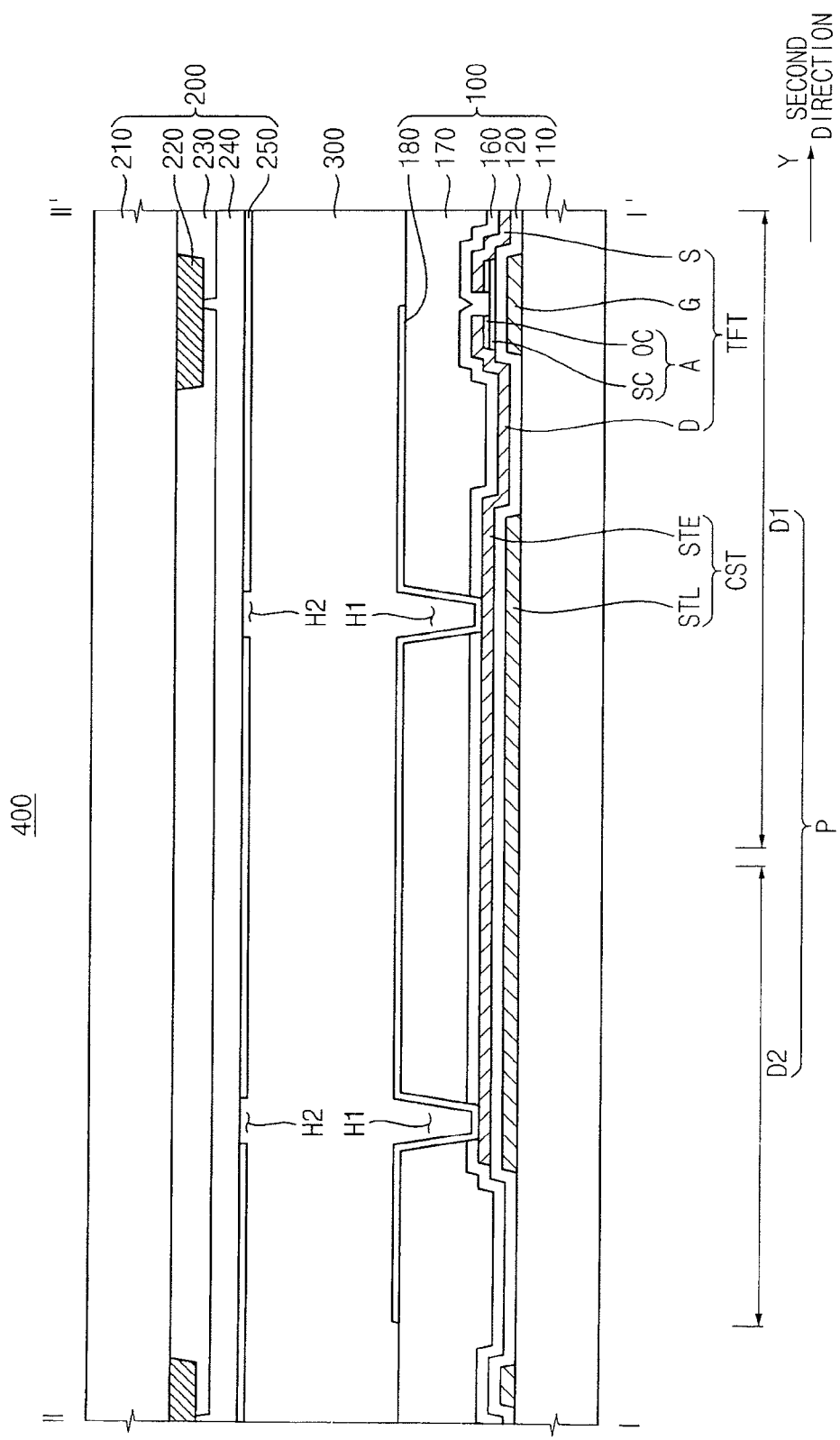
FIG. 3 is a cross-sectional view taken along a line I-I' of FIG. 1 and a line II-II' of FIG. 2, to illustrate an LCD panel including the first and second substrates combined with each other according to the exemplary embodiment of the present invention.

FIG. 1 is a plan view illustrating a first substrate of a liquid crystal display (LCD) panel according to an exemplary embodiment of the present invention. FIG. 2 is a plan view illustrating a second substrate of the LCD panel according to the exemplary embodiment of the present invention. FIG. 3 is a cross-sectional view taken along a line I-I' of FIG. 1 and a line II-II' of FIG. 2, to illustrate the LCD panel including the first and second substrates combined with each other according to an exemplary embodiment of the present invention.

Referring to FIGS. 1 to 3, an LCD panel 400 includes a first substrate 100, a second substrate 200 and a liquid crystal layer 300 disposed between the first and second substrates 100 and 200.

The first substrate 100 includes a first base substrate 110, gate lines GLn−1, GLn, ..., data lines DLm−1, DLm, ..., a thin-film transistor (TFT), a passivation layer 160, a pixel electrode 180 and a storage capacitor CST.

The first base substrate 110 includes a transparent material that transmits light. For example, the first base substrate 110 may include glass.

The gate lines GLn−1, GLn, ... are formed on the first base substrate 110 and extend along a first direction X. The gate lines GLn−1, GLn, ... are first metallic patterns that are formed from patterning a first metallic layer.

A gate insulating layer 120 is formed on the first base substrate 110 on which the gate lines GLn−1, GLn, ... are formed. Examples of a material that can be used for the gate insulating layer 120 may include silicon nitride (SiNx).

The data lines DLm−1, DLm, ... are formed on the gate insulating layer 120 and extend along a second direction Y crossing the first direction X.

The data lines DLm−1, DLm, ... are second metallic patterns that are formed from patterning a second metallic layer. A longitudinal direction of the data lines DLm−1, DLm, ... crosses that of the gate lines GLn−1, GLn, .... The gate and data lines GLn−1, GLn, ... and DLm−1, DLm, ... define unit pixels P having a matrix shape on the first base substrate 110.

As an example, a unit pixel P may be defined by the n-th gate line GLn and the m-th data line DLm crossing each other. A TFT, a pixel electrode 180, a storage line STL and a storage electrode STE are formed in the unit pixel P.

The TFT is formed in a cross portion between the n-th gate line GLn and the m-th data line DLm, and includes a gate electrode G, an active layer A, a source electrode S and a drain electrode D.

The gate electrode G is the first metallic pattern that protrudes from the n-th gate line GLn. The gate insulating layer 120 is formed on the gate electrode G. The active layer A is formed on the gate insulating layer 120 to overlap with the gate electrode G.

The active layer A includes a semiconductor layer SC and an ohmic contact layer OC that overlap with each other. Examples of a material that can be used for the semiconductor layer SC may include amorphous silicon (a-Si:H). Examples of a material that can be used for the ohmic contact layer OC may include amorphous silicon doped with N type dopants (n+a-Si:H) at a high concentration.

The source electrode S and the drain electrode D are formed from the same second metallic patterns as the data lines DLm−1, DLm, ... on the active layer A.

The source electrode S protrudes from the m-th data line DLm to overlap with the active layer A. The drain electrode D is separated from the source electrode by a predetermined distance, and partially overlaps with the active layer A.

A portion of the ohmic contact layer OC, which is disposed between the source electrode S and the drain electrode D, is removed to expose the semiconductor layer SC.

The TFT is a switching device that applies a pixel voltage to the pixel electrode 180 according to a timing signal applied from the gate electrode G.

The pixel electrode 180 includes a first sub-electrode 181 and a second sub-electrode 182. A first domain D1 and a second domain D2 are respectively defined by the first and second sub-electrodes 181 and 182 in the unit pixel P.

The storage line STL is a metallic pattern that is formed from the same layer as the gate lines GLn−1, GLn, ..., and includes a first line portion L1 and a second line portion L2.

The second line portion L2 is disposed between the (n−1)-th gate line GLn−1 and the n-th gate line GLn and extends along the first direction X. For example, the second line portion L2 may be disposed between the first and second domains D1 and D2 and extend along the first direction X.

The first line portion L1 is connected to the second line portion L2, and extends along the second direction Y in the unit pixel P. For example, the first line portion L1 may extend from a central portion of the first domain D1 to that of the second domain D2.

Areas corresponding to the central portions of the first and second domain D1 and D2 of the first line portion L1, may be patterned to have a circular shape.

The first line portion L1 includes a contact portion a and a connecting portion b. The contact portion a may be patterned to have a circular shape corresponding to the central portions of the first and second domains D1 and D2. The connecting portion b connects the contact portions a with each other that are respectively formed in the first and second domains D1 and D2.

The contact portion a may be formed to have a diameter between about 12 μm and about 40 μm. The connecting portion b may be formed to have a width between about 4 μm and about 7 μm.

The storage electrode STE is the second metallic pattern connected with the drain electrode D. The storage electrode STE is patterned to have substantially the same shape as the storage line STL, and to overlap with the storage line STL in the unit pixel P. For drawing convenience, the storage electrode STE is illustrated to have a somewhat larger width than the storage line STL in FIG. 1, but the storage electrode STE may be formed to have a smaller width than the storage line STL, to have the same width as the storage line STL, or to have a larger width than the storage line STL.

The gate insulating layer 120 is disposed between the storage electrode STE and the storage line STL, and the storage electrode STE and the storage line STL overlap with each other. Thus, the storage electrode STE and the storage line STL form the storage capacitor CST that can be used to charge the pixel voltage in one frame.

The passivation layer 160 is formed on the first base substrate 110 on which the TFT and the storage capacitor CST are formed.

Examples of a material that can be used for the passivation layer 160 may include SiNx. A first hole H1 is formed in the passivation layer 160, for exposing the storage electrode STE in the contact portion a.

The first substrate 100 may further include an organic insulating layer 170 formed on the passivation layer 160. The organic insulating layer 170 coats a surface of the first base substrate 110 on which the gate lines GLn−1, GLn, . . . , the data lines DLm−1, DLm, . . . and the TFT are formed. The first hole H1 is extended to be formed in the organic insulating layer 170, for exposing the storage electrode STE.

The pixel electrode 180 is formed on the insulating layer 170. The pixel electrode 180 includes a transparent conductive material, and examples of materials that can be used for the pixel electrode 180 may include indium tin oxide (ITO), indium zinc oxide (IZO), etc.

The pixel electrode 180 includes the first sub-electrode 181 defining the first domain D1 and the second sub-electrode 182 defining the second domain D2. The first and second sub-electrodes 181 and 182 are electrically connected with each other.

Each edge of the first and second sub-electrodes 181 and 182 is patterned to have a rounded shape and may approach a circular shape. In addition, for example, a width of the first line portion L1 of the storage line STL and the storage electrode STE gradually extends along the rounded edges of the first and second sub-electrodes 181 and 182.

The storage line STL and the storage electrode STE are patterned to extend along the rounded edges of the first and second sub-electrodes 181 and 182. Thus, light leakage may be prevented in an area that includes no pixel electrode between the first and second domains D1 and D2, and a charged capacity of the storage capacitor CST may be increased.

The pixel electrode 180 makes contact with the storage electrode STE through the first hole H1 formed in the passivation layer 160, thereby receiving a pixel voltage.

The second substrate 200 includes a second base substrate 210, a black matrix 220, a color filter 230 and a common electrode 250.

The second base substrate 210 includes a transparent material that transmits light. Examples of a material that can be used for the second base substrate 210 may include glass.

The black matrix 220 is formed on the second base substrate 210 to face the first substrate 100. For example, the black matrix 220 may be formed to correspond to the gate lines GLn−1, GLn, . . . that are formed on the first substrate 100, so that light leakage between the unit pixels adjacent to each other along the second direction Y may be prevented.

For example, the color filter 230 including a red filter, a green filter and a blue filter may be formed on the second base substrate 210 corresponding to each unit pixel P. The color filter 230 and the black matrix 220 may partial overlap.

The second substrate 200 may further include an overcoat layer 240 formed on the color filter 230. The overcoat layer 240 coats a surface of the second base substrate 210 on which the black matrix 220 and the color filter 230 are formed.

The common electrode 250 is formed on the overcoat layer 240 corresponding to the first base substrate 200. The common electrode 250 includes a transparent conductive material. Examples of materials that can be used for the common electrode 250 may include indium tin oxide (ITO), indium zinc oxide (IZO), etc.

A second hole H2 that overlaps with the storage line STL is formed in the common electrode 250. For example, the second hole H2 may be formed to correspond to central portions of the first and second domains D1 and D2, respectively.

For example, the storage line STL, the storage electrode STE, the first hole H1 and the second hole H2 may overlap with one another in a line substantially perpendicular to both of the first and second directions X and Y.

The storage line STL and the storage electrode STE may be respectively formed to have a constant area ratio in the unit pixel, to form the storage capacitor CST that charges the pixel voltage. However, since the storage line STL and the storage electrode STE include metallic materials, the light is blocked and an opening ratio of the unit pixel P is reduced.

In addition, when the LCD panel 400 is driven, the arrangement of liquid crystal molecules changes so that light is not transmitted by collisions of the liquid crystal molecules in an area corresponding to the second hole H2, and a singular point that does not transmit light is formed. Accordingly, the second hole H2 also reduces the opening ratio of the unit pixel P.

However, according to an exemplary embodiment of the present invention, the storage line STL, the storage electrode STE and the second hole H2 are overlapped with one another, so that the reduction of the opening ratio due to the second hole H2 may be prevented.

In addition, since the second line portion L2 of the storage line STL is formed between the first and second sub-electrodes 181 and 182 that do not normally transmit light, the reduction of the opening ratio due to the storage line STL may be prevented. Accordingly, the opening ratio of the unit pixel P may be improved.

When an electric field is not generated between the first and second substrates 100 and 200 since no voltage is applied to the pixel electrode 180 and the common electrode 250, the arrangement of liquid crystal molecules of the liquid crystal layer 300 is substantially perpendicular to the first and second substrates 100 and 200. Accordingly, light does not pass through the liquid crystal layer 300 even if the light is provided from a rear surface of the LCD panel 100.

When voltage is applied to the pixel electrode 180 and the common electrode 250, an electric flux line having a diagonal direction is formed around the second hole H2, so that the liquid crystal molecules adjacent to the electric flux line respond more quickly. Accordingly, the arrangement of liquid crystal molecules is changed substantially perpendicular to or substantially parallel with the electric flux line around the second hole H2, to transmit light.

In a similar way, the electric flux line having the diagonal direction is formed around the edges of the first and second sub-electrodes 181 and 182, so that the liquid crystal molecules adjacent to the electric flux line respond more quickly. Accordingly, the arrangement of liquid crystal molecules is changed substantially perpendicular to or substantially parallel with the electric flux line around the first and second sub-electrodes 181 and 182, to transmit the light.

However, the liquid crystal molecules disposed in a middle area between the second hole H2 and the edges of the first and second sub-electrodes 181 and 182, are relatively less affected by the electric flux line, so that the response to the electric flux line is delayed.

When the response speed is different in every area, image quality is deteriorated. Thus, to improve the response speed in the middle area, more intensive electric flux lines may be generated in each of the domains D1 and D2.

Accordingly, to generate more intensive electric flux lines, the second hole H2 may be formed to have a diameter between about 12 µm and 30 µm larger than a conventional hole having about a 10 µm diameter.

The electric flux line generated in each of the domains D1 and D2 increases as the area of the second hole H2 increases, so that the response speed may be improved. However, the singular point increases as the area of the second hole H2 increases, so that the opening ratio of the unit pixel P is reduced.

In an exemplary embodiment of the present invention, the storage line STL may be formed on the first substrate 100 to overlap with the second hole H2, and the area of the contact portion a that overlaps with the second hole H2 may be formed to be the same or larger than that of the second hole H2, to maintain the ratio of the area occupied by the storage line STL in the unit pixel P. Thus, the reduction of the opening ratio due to the increase in the area of the second hole H2 may be prevented.

According to at least one embodiment of the present invention, the response speed of the liquid crystal molecules in the liquid crystal layer 300 may be improved and the opening ratio of the unit pixel P may be enhanced.

Figure 4:
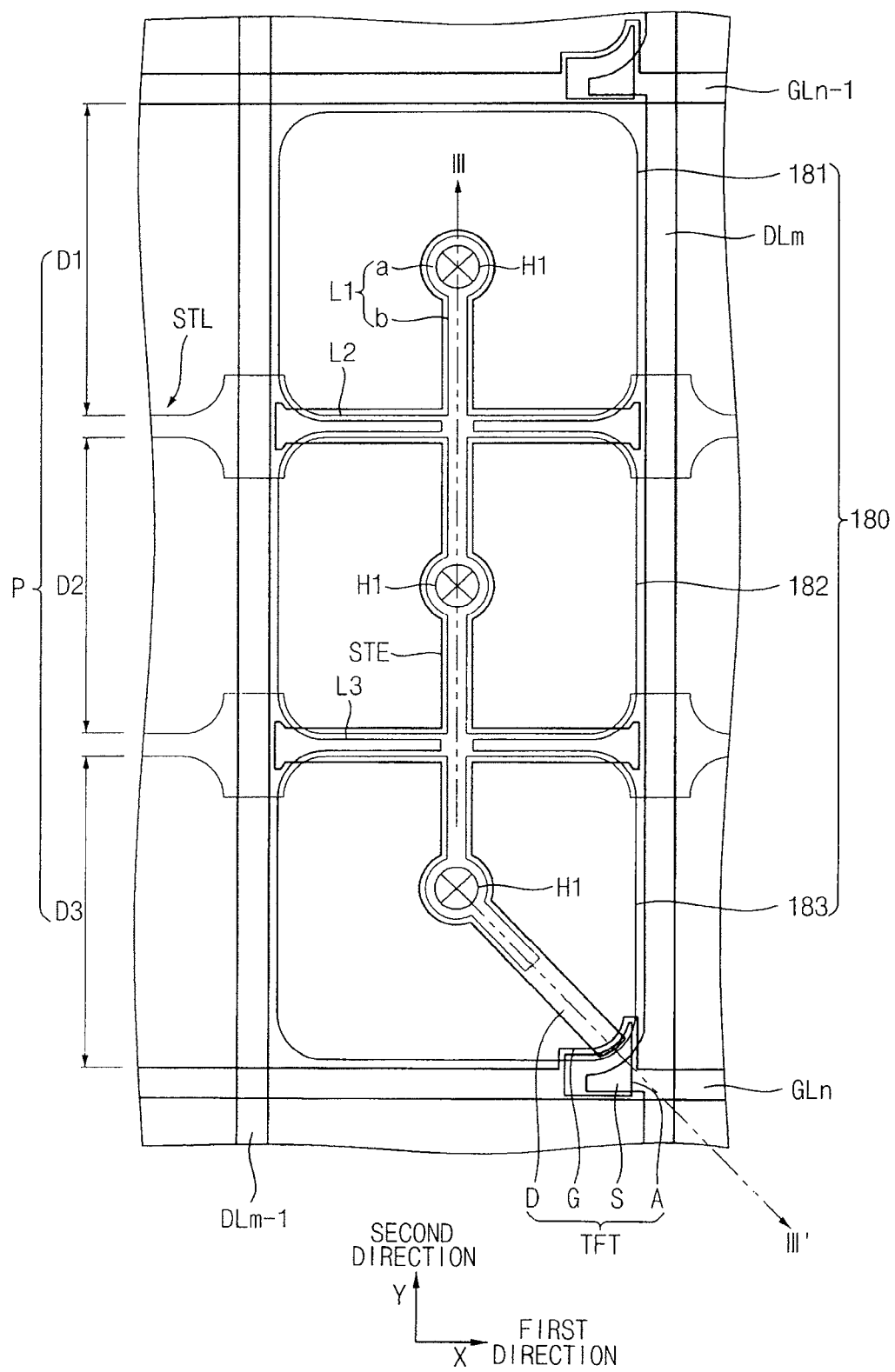
FIG. 4 is a plan view illustrating a first substrate of an LCD panel according to another exemplary embodiment of the present invention.
Figure 5:
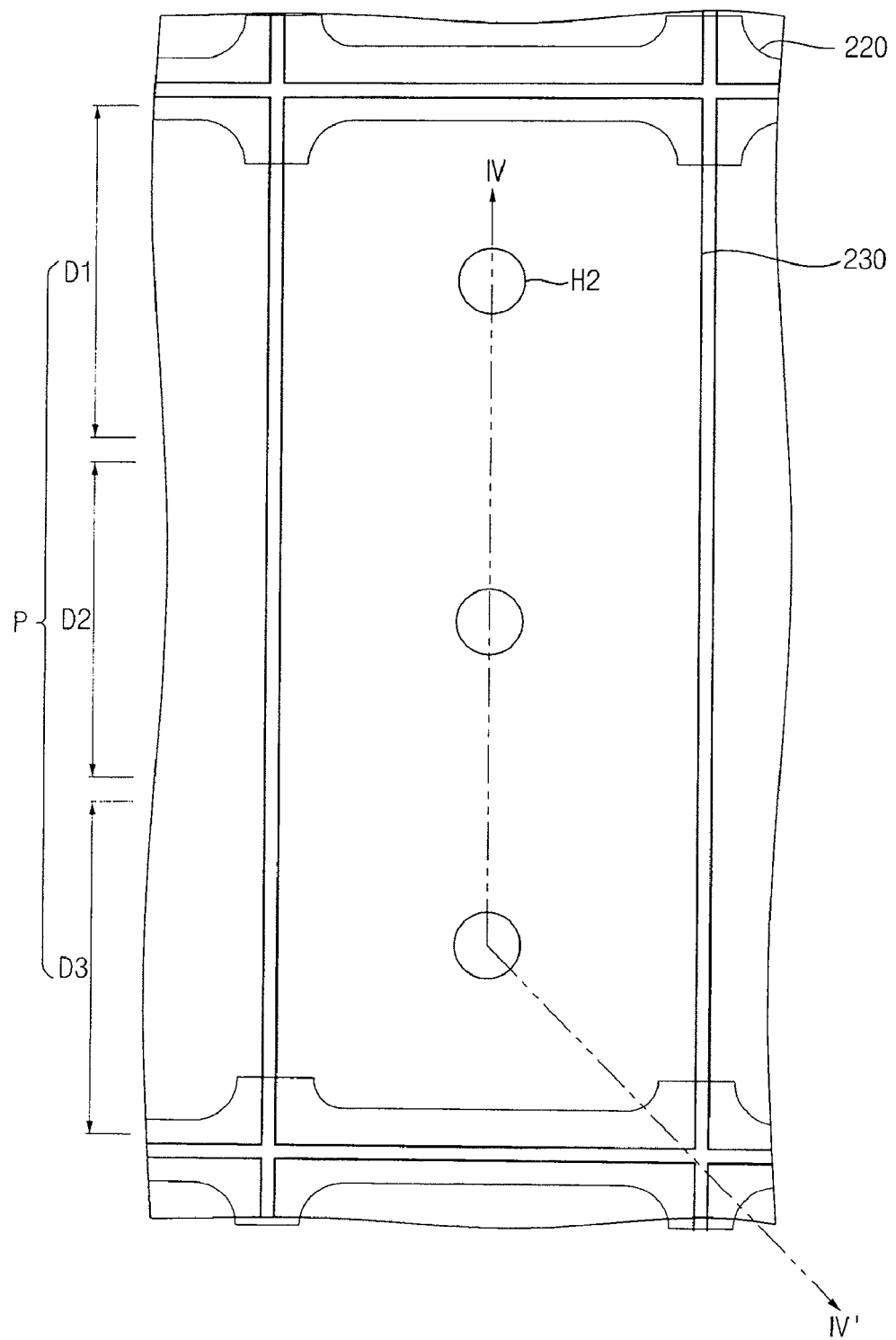
FIG. 5 is a plan view illustrating a second substrate of the LCD panel according to another exemplary embodiment of the present invention.
Figure 6:
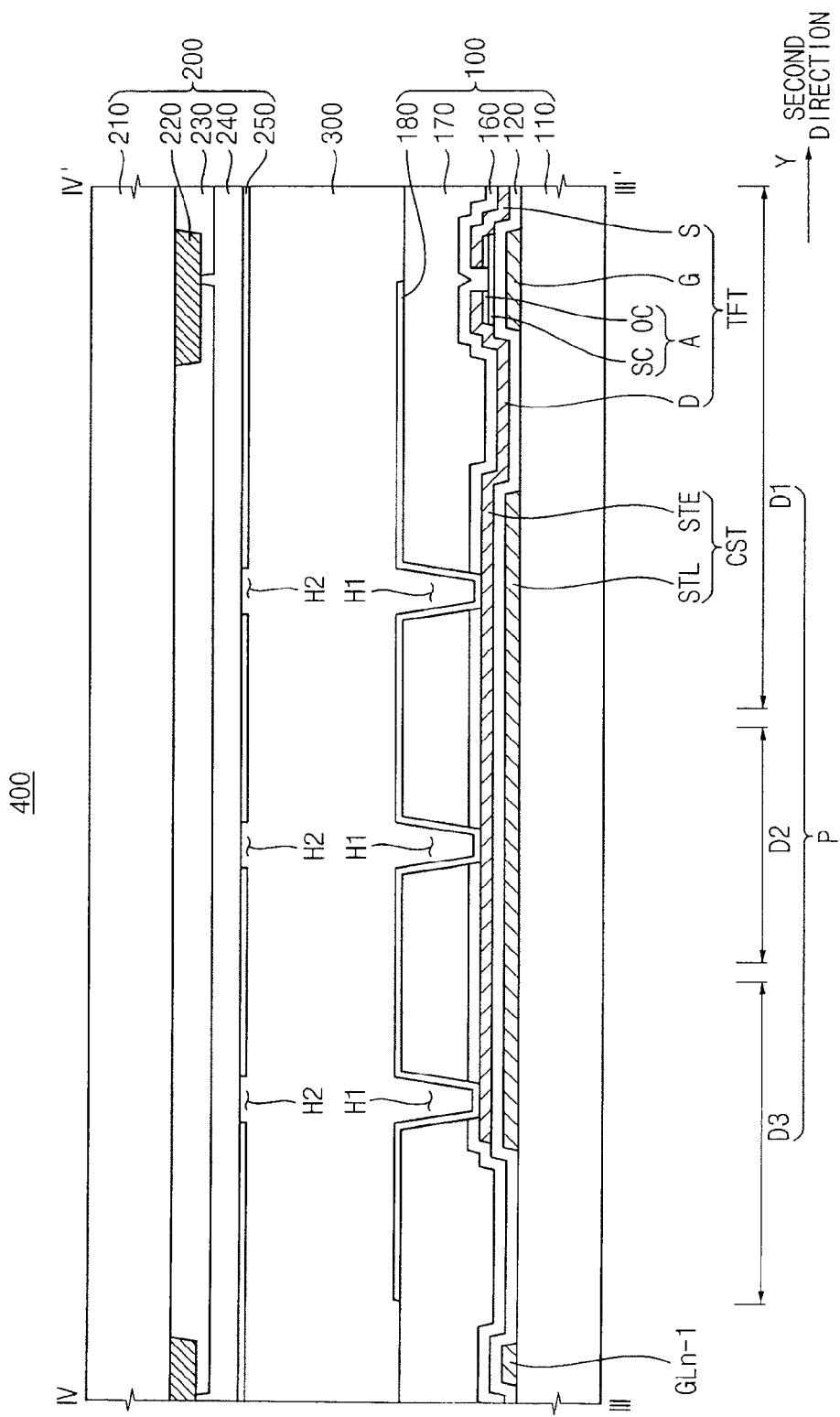
FIG. 6 is a cross-sectional view taken along a line III-III' of FIG. 4 and a line IV-IV' of FIG. 5, to illustrate an LCD panel including the first and second substrates combined with each other according to the exemplary embodiment of the present invention.

FIG. 4 is a plan view illustrating a first substrate of an LCD panel according to an exemplary embodiment of the present invention. FIG. 5 is a plan view illustrating a second substrate of the LCD panel according to an exemplary embodiment of the present invention. FIG. 6 is a cross-sectional view taken along a line III-III' of FIG. 4 and a line IV-IV' of FIG. 5, to illustrate the LCD panel including the first and second substrates combined with each other according to an exemplary embodiment of the present invention.

Since an LCD panel 400 illustrated in FIGS. 4-6 is similar to the LCD panel illustrated in FIGS. 1-3, the same reference numerals will be used to refer to the same or like parts and repetitive explanations of similar elements will be avoided.

Referring to FIGS. 4 to 6, a storage line STL of the LCD panel 400 includes a first line portion L1, a second line portion L2 and a third line portion L3.

The second and third line portions L2 and L3 extend along the first direction X between an (n−1)-th gate line GLn−1 and an n-th gate line GLn.

Accordingly, a unit pixel P is sequentially divided into a first domain D1, a second domain D2 and a third domain D3 along the second direction Y.

The first line portion L1 is electrically connected to the second line portion L2 and the third line portion L3, and extends along the second direction Y in the unit pixel. For example, the first line portion L1 may extend along the second direction Y from a central portion of the first domain D1 to that of the third domain D3.

The first line portion L1 corresponding to the central portions of the first, second and third domains D1, D2 and D3 is patterned to have a circular shape. The first line portion L1 may include a contact portion a and a connecting portion b. The contact portion a is patterned to have a circular shape corresponding to each portion of the first, second and third domains D1, D2 and D3. The connecting portion b connects the contact portions a with each other. The connecting portion b may be formed to have a narrower width than the contact portion a. For example, the width of the connecting portion b may be between about 4 µm and about 7 µm.

A storage electrode STE electrically connected to a drain electrode D is formed to have substantially the same shape as the storage line STL in the unit pixel P to overlap with the storage line STL.

A passivation layer 160 is formed on a first base substrate 110 on which the second metallic pattern including data lines DLm−1, DLm, . . . , a source electrode S, the drain electrode D and the storage electrode STE is formed. A first hole H1 is formed in the passivation layer 160, corresponding to the central portion of the first domain D1, that of the second domain D2 and that of the third domain D3, to expose the storage electrode STE in the contact portion a.

An organic insulating layer 170 may be formed on the passivation layer 160. The organic insulating layer 170 is similar to that discussed above with respect to FIGS. 1-3.

A pixel electrode 180 is formed on the organic insulating layer 170. The pixel electrode 180 includes a first sub-electrode 181 patterned to correspond to the first domain D1, a second sub-electrode 182 patterned to correspond to the second domain D2, and a third sub-electrode 183 patterned to correspond to the third domain D3. The first, second and third sub-electrodes 181, 182 and 183 are electrically connected to one another. The first, second and third sub-electrodes 181, 182 and 183 make contact with the storage electrode STE through the first hole H1 formed on the passivation layer 160, and receives the pixel voltage from the storage electrode STE.

A black matrix 220, a color filter 230, an overcoat layer 240 and a common electrode 250 are formed on a second substrate 200 that is combined with the first substrate 100. The black matrix 220, the color filter 230, the overcoat layer 240 and the common electrode 250 are similar to those discussed above with respect to FIGS. 1-3.

A second hole H2 that overlaps with the storage line STL of the first substrate 100 is formed in the common electrode 250 that is formed on the overcoat layer 240 to correspond to the second substrate. For example, the second hole H2 may be formed to correspond to the contact portion a of the storage line STL.

According to an exemplary embodiment of the present invention, the storage line STL, the storage electrode STE, the first hole H1 and the second hole H2 may be overlapped with one another in a line substantially perpendicular to both of the first and second directions X and Y.

Thus, the reduction of the opening ratio due to the second hole H2 may be prevented, so that the opening ratio of the unit pixel P may be enhanced.

To increase the intensity of the electric flux line generated in each domain, the second hole H2 may be formed to have a larger diameter than a hole having about a 10 µm diameter formed in the conventional common electrode. For example, the diameter of the second hole H2 may be between about 12 µm and about 30 µm.

The electric flux line generated in each of the domains D1, D2 and D3 increases as the area of the second hole H2 increases, so that the response speed may be improved. However, the singular point increases as the area of the second hole H2 increases, so that the opening ratio of the unit pixel P is reduced.

In an exemplary embodiment of the present invention, the storage line STL is formed on the first substrate 100 to overlap with the second hole H2, and the area of the contact portion a that overlaps with the second hole H2 is formed to be the same or larger than that of the second hole H2, to maintain the ratio of the area occupied by the storage line STL in the unit pixel P. Thus, the reduction of the opening ratio due to the increase of the area of the second hole H2 may be prevented.

According to at least one embodiment of the present invention, the response speed of the liquid crystal molecules in the liquid crystal layer 300 may be improved and the opening ratio of the unit pixel P may be enhanced.

FIGS. 7 to 12 are cross-sectional views illustrating a method for manufacturing an LCD panel according to an exemplary embodiment of the present invention. The method for manufacturing the LCD panel will be discussed with respect to the LCD panel illustrated in FIGS. 1 to 3.

Figure 7:
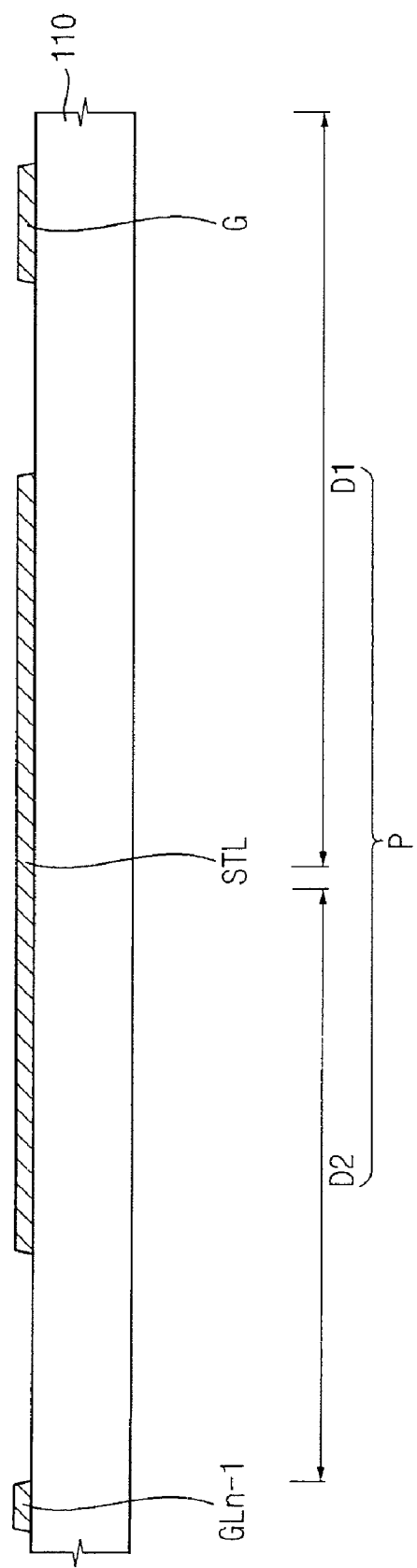
FIGS. 7 to 12 are cross-sectional views illustrating a method for manufacturing an LCD panel according to an exemplary embodiment of the present invention.

Referring to FIGS. 1 and 7, the first metallic layer is formed on the first base substrate 110 via a sputtering process. Then, the first metallic layer is patterned via a photolithography process, to form the first metallic pattern including the gate lines GLn−1, GLn, . . . , the gate electrode G and the storage line STL.

The gate lines GLn−1, GLn, . . . extend along the first direction X on the first base substrate 110. The gate electrode G is protrudes from the gate lines GLn−1, GLn, . . . .

The storage line STL includes the first and second line portions L1 and L2.

The second line portion L2 extends along the first direction X between the (n−1)-th gate line GLn−1 and the n-th gate line GLn. For example, the second line portion L2 may extend along the first direction X between the first and second domains D1 and D2.

The first line portion L1 is electrically connected to the second line portion L2, and extends along the second direction Y in the unit pixel P. For example, the first line portion L1 may extend from the central portion of the first domain D1 to that of the second domain D2.

For example, the area corresponding to the central portions of the first and second domains D1 and D2 of the first line portion L1 may be patterned to have a circular shape.

The first line portion L1 includes the contact portion a and the connecting portion b. The contact portion a is patterned to have the circular shape corresponding to each first and second domains D1 and D2. The connecting portion b connects the contact portions a formed in the first and second domains D1 and D2 with each other.

For example, the contact portion 'a' may be formed to have a diameter between about 12 μm and about 40 μm. For example, the connecting portion b may be formed to have a width between about 4 μm and about 7 μm.

Figure 8:
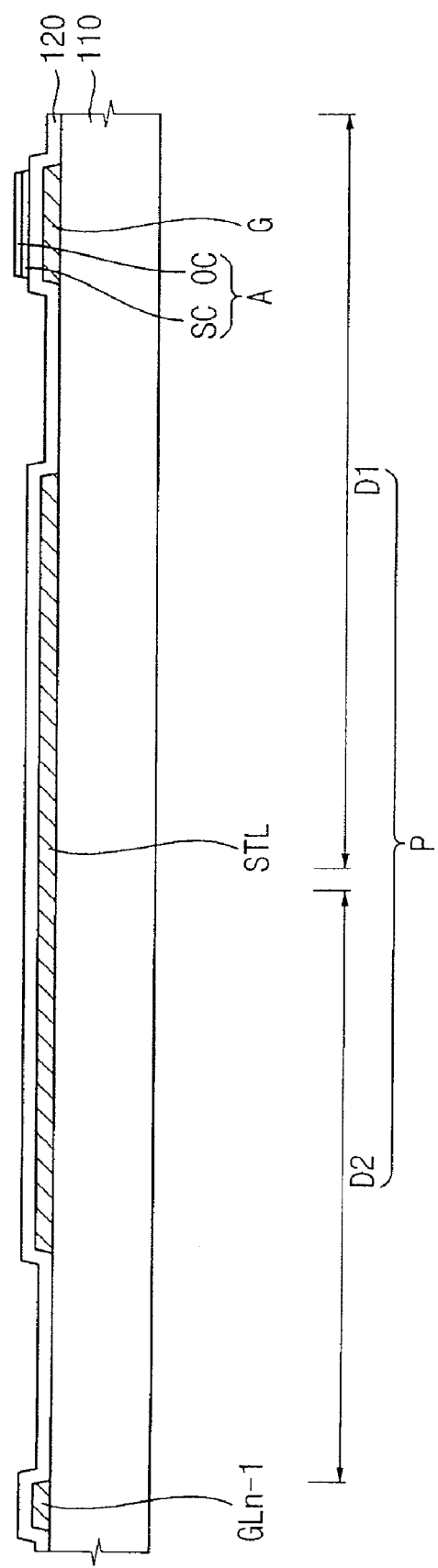

Referring to FIGS. 1 and 8, the gate insulating layer 120 is formed via a chemical vapor deposition (CVD) process on the first base substrate 110 on which the first metallic pattern is formed. Examples of materials that can be used for the gate insulating layer 120 may include SiNx or silicon oxide (SiOx).

Then, the semiconductor layer SC, which may include, for example, amorphous silicon (a-Si) and the ohmic contact layer OC, which may include amorphous silicon (a-Si) doped with ions are sequentially formed on the gate insulating layer 110. The semiconductor layer SC and the ohmic contact layer OC may be formed via the CVD process.

Then, the ohmic contact layer OC and the semiconductor layer SC are substantially simultaneously patterned via the photolithography process, to form the active layer A overlapped with the gate electrode G on the gate insulating layer 120.

Figure 9:
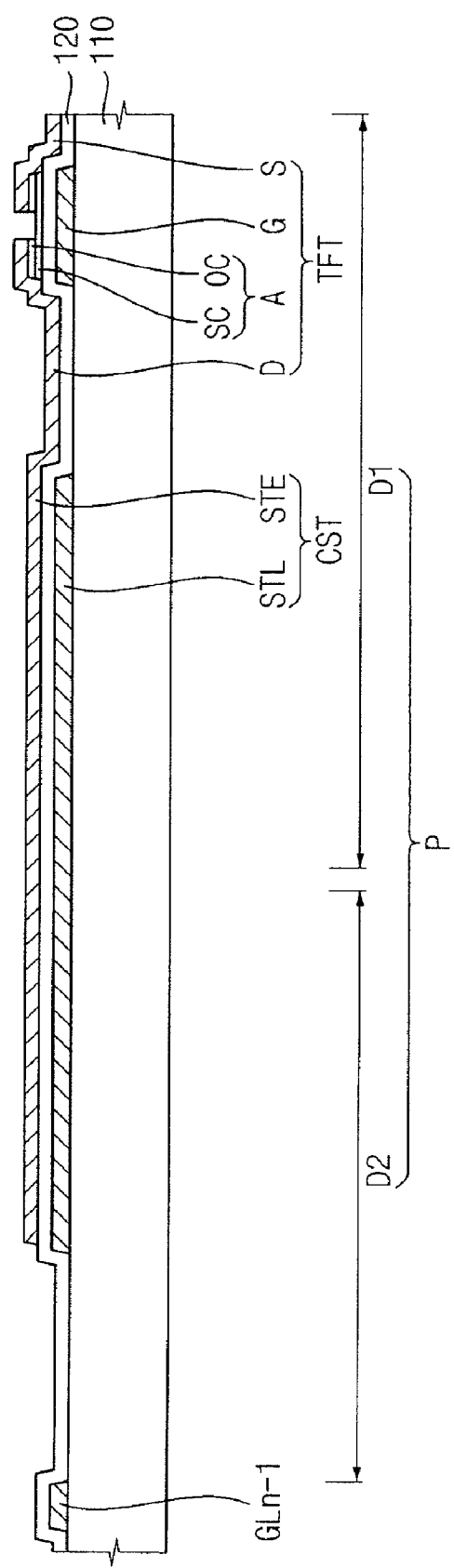

Referring to FIGS. 1 and 9, the second metallic layer is formed on the first base substrate 110 where the active layer A is formed via the sputtering process. The second metallic layer is patterned via the photolithography process, to form the second metallic pattern that includes the data lines DLm−1, DLm, . . . , the source electrode S, the drain electrode D and the storage electrode STE.

The data lines DLm−1, DLm, . . . extend along the second direction Y crossing the gate lines GLn−1, GLn, . . . on the gate insulating layer 120.

The source electrode S protrudes from the data lines DLm−1, DLm, . . . , and partially overlaps with the active layer A.

The drain electrode D is separated from the source electrode S by a predetermined distance, and partially overlaps with the active layer A.

The storage electrode STE is connected to the drain electrode D, and is patterned in the unit pixel P as the storage line STL. For example, the gate insulating layer 120 may be disposed between the storage electrode STE and the storage line STL and the storage electrode STE may overlap with the storage line STL, thereby forming the storage capacitor CST.

Then, the ohmic contact layer OC exposed at an opening portion between the source electrode S and the drain electrode D is etched by using the second metallic pattern as a mask.

Accordingly, the TFT including the gate electrode G, the active layer A, the source electrode S and the drain electrode D is formed.

Figure 10:
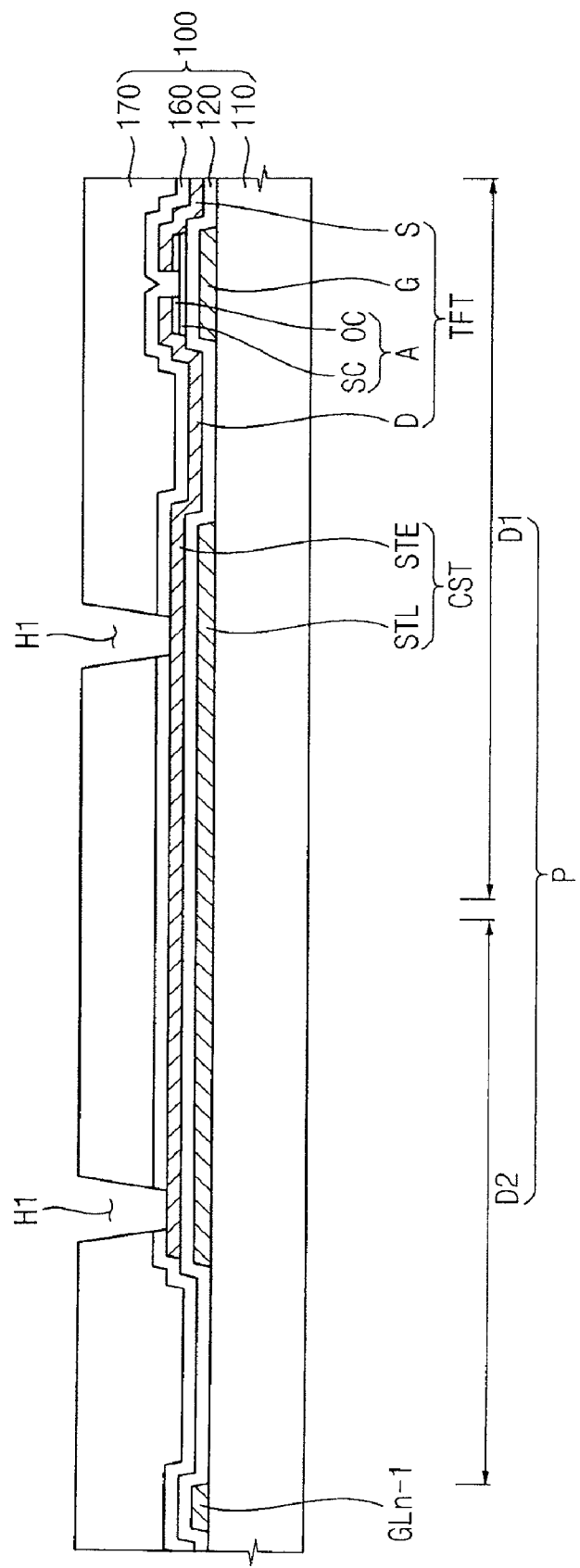

Referring to FIGS. 1 and 10, the passivation layer 160 is formed via the CVD process on the first base substrate 110 on which the TFT is formed. Examples of materials that can be used for the passivation layer 160 may include SiNx and SiOx.

Then, a photo-sensitive organic material is coated on the passivation layer 160. The photo-sensitive organic material includes a transparent material.

Then, the photo-sensitive organic material is patterned via an exposure process and a development process, so that the first hole H1 exposing the passivation layer 160 in the contact portion a is formed.

Then, the photo-sensitive organic material that the first hole H1 is formed on is baked, so that the photo-sensitive organic material is hardened. Accordingly, the organic insulating layer 170 on which the first hole H1 is formed, is formed on the passivation layer 160.

Then, the passivation layer 160 exposed through the first hole H1 is etched by using the organic insulating layer 170 as a mask. For example, the passivation layer 160 may be etched by a dry etching process.

Accordingly, the first hole H1 is also formed in the passivation layer 160, so that the storage electrode STE in the contact portion a is exposed. Alternatively, the organic insulating layer 170 may be eliminated.

Figure 11:
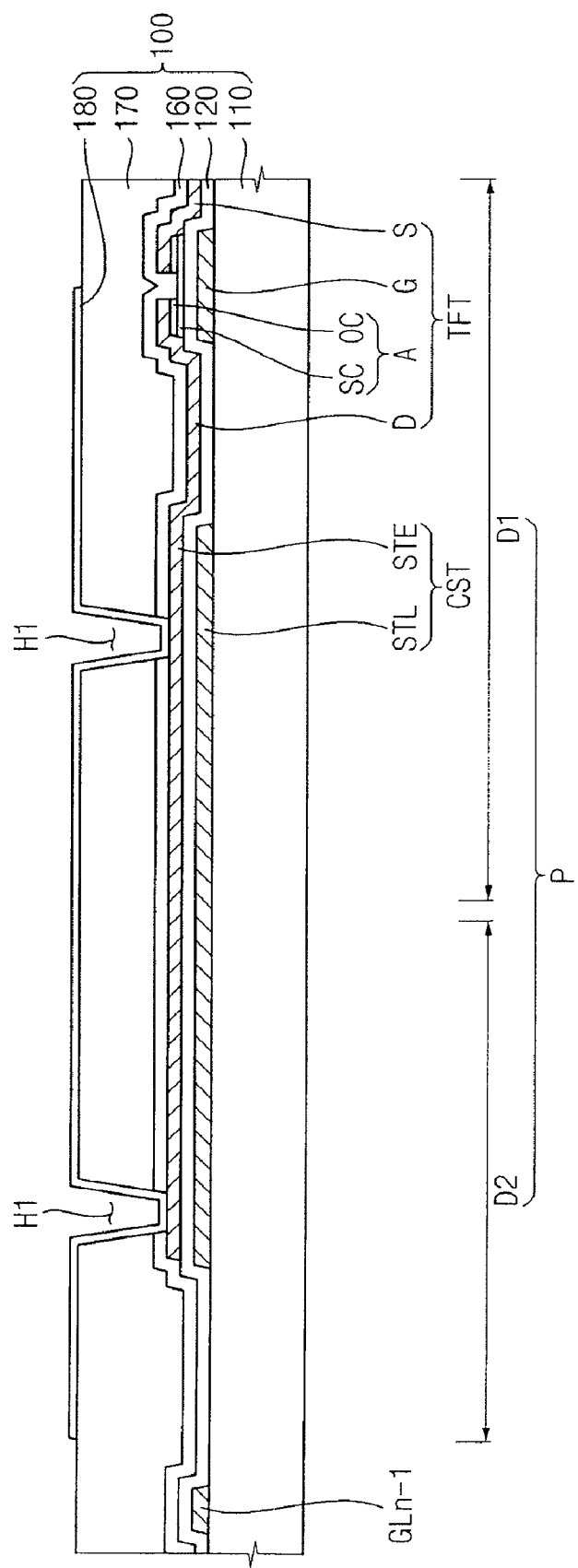

Referring to FIGS. 1 and 11, a transparent electrode layer is formed on the insulating layer 170 on which the first hole H1 is formed. Examples of materials that can be used for the transparent electrode layer may include ITO, IZO, amorphous ITO (a-ITO), etc. The transparent electrode layer may be deposited via the sputtering process.

Then, the transparent electrode layer is patterned via the photolithography process, so that the pixel electrode 180 including the first and second sub-electrodes 181 and 182 is formed.

The first sub-electrode 181 defines the first domain D1 in the unit pixel P. The second sub-electrode 182 defines the second domain D2 in the unit pixel P.

The first and second domains D1 and D2 are sequentially arranged along the second direction Y in the unit pixel P.

For example, the first sub-electrode 181 may be patterned to have the same distance from a central portion to an edge portion in an entire direction. However, when the first sub-electrode is formed to have a circular shape, the opening ratio of the first domain D1 is more reduced, so that the first sub-electrode 181 is patterned to have a rectangular shape with rounded edges.

The second sub-electrode 182 is also formed to have the same shape as the first sub-electrode 181. The first and second sub-electrodes 181 and 182 are patterned to be partially connected with each other on the storage electrode STE.

For example, the storage line STL and the storage electrode STE may be patterned, so that the widths of the storage line STL and the storage electrode STE gradually extend along the rounded surface of the first and second sub-electrodes 181 and 182. The storage line STL and the storage electrode STE may be patterned to gradually extend along the rounded surface, so that the light leakage in the area having no pixel electrode 180 may be prevented, and the charged capacity of the storage capacitor CST may be increased.

Accordingly, the first substrate 100 of the LCD panel is manufactured.

Figure 12:
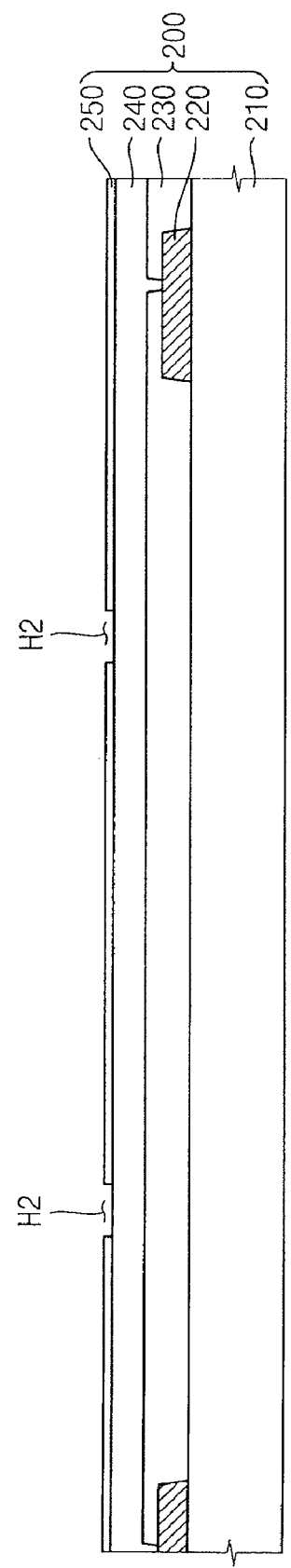

Referring to FIGS. 1, 2 and 12, a photo-sensitive organic material including a shading material is deposited on the second base substrate 210, and the photo-sensitive organic material including the shading material is patterned via the photolithography process including exposure, development and hardening processes, so that the black matrix 210 is formed.

For example, the black matrix 210 may be patterned to correspond to the gate lines GLn−1, GLn, . . . on the first substrate 100. Alternatively, the metallic layer may be formed on the second base substrate 210 and the metallic layer may be patterned via the photolithography process, so that the black matrix may be formed.

Then, the photo-sensitive organic material that displays a selected one among red, green and blue colors is deposited on the second base substrate 200 on which the black matrix 220 is formed.

Then, the color photo-sensitive organic material is patterned by the photolithography process, to form the color filter 230 corresponding to the unit pixel P of the first substrate 100.

Then, the overcoat layer 240 is formed on the surface of the second substrate 210 on which the black matrix 220 and the color filter 230 are formed. For example, the overcoat layer 240 may include a photo-sensitive organic material having a transparent material.

Then, the common electrode 250 including a transparent conductive material is formed on the overcoat layer 240. Examples of materials that can be used for the common electrode 250 may include ITO, IZO, a-ITO, etc. The common electrode 250 may be deposited via the sputtering process.

Then, the common electrode 250 is patterned via the photolithography process, to form the second hole H2 that is overlapped with the storage line STL on the first substrate 100. For example, the second hole H2 may be formed to correspond to the contact portion a. Accordingly, the second substrate of the LCD panel is manufactured.

Referring to FIGS. 11 and 12, the first and second substrates 100 and 200 are combined with each other, so that the pixel electrode 180 on the first substrate 100 faces the common electrode 250.

For example, a sealant may be deposited on the edges of the first substrate 100, and the second substrate 200 may be compressed on the first substrate 100 where the sealant is deposited on, so that the first and second substrates 100 and 200 are combined with each other.

Then, the liquid crystal layer 300 is disposed between the first and second substrates 100 and 200. The liquid crystal layer 300 includes liquid crystal molecules having a VA mode. Accordingly, the LCD panel 400 illustrated in FIG. 3 is completely manufactured.

While, the method for manufacturing the LCD panel has been explained with respect to the LCD panel 400 illustrated in FIGS. 1 to 3, the LCD panel 400 illustrated in FIGS. 4 to 6 may be manufactured by the same method mentioned above.

According to at least one embodiment of the present invention, a storage line and a storage electrode form a storage capacitor, and a second hole in the common electrode are overlapped with one another in a plane. Accordingly, the elements that transmit no light and thus reduce the opening ratio of a unit pixel, are overlapped with one another, so that the opening ratio of the unit pixel may be enhanced.

In addition, although the second hole may be formed to have more than a 10 μm diameter to improve the response speed of the liquid crystal layer, the storage line having the same or larger area than that of the second hole may be formed under the second hole, so that the opening ratio is not changed. Accordingly, the response speed of the liquid crystal layer may be improved and the opening ratio of the unit pixel may be enhanced.

Having described exemplary embodiments of the present invention, it is to be understood that various changes, substitutions and alterations can be made herein without departing from the spirit and scope of the invention as defined by appended claims.

What is claimed is:

1. A liquid crystal display (LCD) panel comprising:
a first substrate having a plurality of gate lines, a plurality of data lines, a storage line and a pixel electrode, wherein the gate lines extend along a first direction, the data lines extend along a second direction crossing the first direction, the gate and data lines define a unit pixel, the storage line includes a first line portion that extends along the second direction in the unit pixel, and the pixel electrode divides the unit pixel into a first domain and a second domain;
a second substrate faces the first substrate and includes a common electrode having a first hole and a second hole, wherein the first hole overlaps with the storage line and is located within the first domain and the second hole overlaps with the storage line and is located within the second domain; and
a liquid crystal layer disposed between the first and second substrates.

2. The LCD panel of claim 1, wherein the storage line further comprises a second line portion that extends along the first direction between the first and second domains.

3. The LCD panel of claim 1, wherein the first line portion comprises:
first and second contact portions that are patterned to have substantially circular shapes to correspond to central portions of the first and second domains, respectively; and
a connecting portion, formed to have a narrower width than diameters of the first and second contact portions, and to connect the first contact portion formed in the first domain with the second contact portion formed in the second domain.

4. The LCD panel of claim 3, wherein the first hole overlaps with the first and second contact portions.

5. The LCD panel of claim 4, wherein a diameter of the first hole is between about 12 μm and about 30 μm.

6. The LCD panel of claim 1, wherein the first substrate further comprises:

a gate electrode electrically connected to a gate line of the plurality of gate lines;

a source electrode electrically connected to a data line of the plurality of data lines;

a drain electrode separated from the source electrode by a predetermined distance; and a storage electrode electrically connected to the drain electrode and overlapped with the storage electrode in the unit pixel.

7. The LCD panel of claim 6, wherein a gate insulating layer is formed between a first metallic pattern including the gate line, the storage line and the gate electrode, and a second metallic pattern including the data line, the source electrode, the drain electrode and the storage electrode.

8. The LCD panel of claim 7, further comprising a passivation layer, wherein the passivation layer is formed between the second metallic pattern and the pixel electrode and the passivation layer has a third hole that corresponds to the first hole and is formed in the passivation layer.

9. The LCD panel of claim 8, wherein the first hole, the third hole, the storage electrode and the first line portion overlap with one another in a line substantially perpendicular to both of the first and second directions.

10. The LCD panel of claim 8, further comprising an organic insulating layer, wherein the organic insulating layer is formed between the passivation layer and the pixel electrode and the organic insulating layer has a fourth hole that corresponds to the third hole and is formed in the organic insulating layer.

11. The LCD panel of claim 2, wherein the pixel electrode comprises:
a first sub-electrode defining the first domain and having rounded edges; and
a second sub-electrode defining the second domain and having the rounded edges,
wherein the first sub-electrode and the second sub-electrode are electrically connected with each other.

12. The LCD panel of claim 11, wherein a width of an area adjacent to the data line of the second line portion gradually extends along the rounded edges of the first and second sub-electrodes.

13. The LCD panel of claim 1, wherein the second substrate further comprises:

a color filter formed to correspond to the unit pixel; and
a black matrix formed to correspond to a gate line of the plurality of gate lines.

14. An LCD panel comprising:
a first substrate having a plurality of gate lines, a plurality of data lines, a storage line and a pixel electrode, wherein the gate lines extend along a first direction, the data lines extend along a second direction crossing the first direction, the gate and data lines defining a unit pixel, the storage line including a first line portion that extends along the second direction in the unit pixel, and the pixel electrode divides the unit pixel into a first domain, a second domain and a third domain;
a second substrate faces the first substrate and includes a common electrode having a first hole, a second, and a third hole, wherein the first hole overlaps with the storage line and is located within the first domain, wherein the second hole overlaps with the storage line and is located within the second domain, and the third hole overlaps with the storage line and is located within the third domain; and
a liquid crystal layer disposed between the first and second substrates.

15. The LCD panel of claim 14, wherein the storage line comprises a second line portion that extends along the first direction between the first and second domains, and a third line portion that extends along the first direction between the second and third domains.

16. The LCD panel of claim 14, wherein the first line portion comprises:
first, second and third contact portions that are patterned to have circular shapes to correspond to central portions of the first, second and third domains, respectively; and
a connecting portion, formed to have a narrower width than diameters of the first, second and third contact portions, and to connect the first contact portion formed in the first domain, the second contact portion formed in the second domain and the third contact portion formed in the third domain with one another.

17. The LCD panel of claim 16, wherein the first hole overlaps with the first contact portion, the second hole overlaps with the second contact portion and the third hole overlaps with the third contact portion.

* * * * *